US011462977B2

(12) United States Patent
Hung et al.

(10) Patent No.: US 11,462,977 B2
(45) Date of Patent: Oct. 4, 2022

(54) CLOSED-TYPE LIQUID COOLING MOTOR FRAME AND METHOD FOR MANUFACTURING THE SAME

(71) Applicant: TECO Electric & Machinery Co., Ltd., Taipei (TW)

(72) Inventors: Lian-Shin Hung, Taipei (TW); Yu-De Li, Taipei (TW); Ching-Chih Huang, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 75 days.

(21) Appl. No.: 16/986,688

(22) Filed: Aug. 6, 2020

(65) Prior Publication Data
US 2021/0384806 A1   Dec. 9, 2021

(30) Foreign Application Priority Data

Jun. 5, 2020 (TW) ................................. 109118896

(51) Int. Cl.
| | |
|---|---|
| *H02K 15/00* | (2006.01) |
| *H02K 15/14* | (2006.01) |
| *H02K 15/02* | (2006.01) |
| *B22D 19/00* | (2006.01) |
| *H02K 9/19* | (2006.01) |

(52) U.S. Cl.
CPC ..... *H02K 15/0093* (2013.01); *B22D 19/0054* (2013.01); *H02K 15/0012* (2013.01); *H02K 15/02* (2013.01); *H02K 15/14* (2013.01); *H02K 9/19* (2013.01)

(58) Field of Classification Search
CPC .......... H02K 15/0093; H02K 15/0012; H02K 15/02; H02K 15/14; H02K 9/19; B22D 19/0054
See application file for complete search history.

(56) References Cited

U.S. PATENT DOCUMENTS

2012/0169157 A1\* 7/2012 Lin .......................... H02K 5/20
310/54

FOREIGN PATENT DOCUMENTS

| CN | 201821197 U | \* | 5/2011 |
| CN | 104209472 A | \* | 12/2014 |
| CN | 103286276 B | \* | 1/2015 |
| CN | 104999051 A | \* | 10/2015 |

(Continued)

*Primary Examiner* — Peter Dungba Vo
*Assistant Examiner* — Jose K Abraham
(74) *Attorney, Agent, or Firm* — Muncy, Geissler, Olds & Lowe, P.C.

(57) ABSTRACT

A method includes: forming a sand core including a main portion and core-head members connecting the main portion; applying a casting process to produce a frame casting having a first end, a first-end inner wall, a second end, a second-end inner wall, a closed water channel between the first-end inner wall and the second-end inner wall, a water inlet, a water outlet and sand-expelling holes at the first end; shaking the frame casting to have part of the sand core to leave the closed water channel via the water inlet, the water outlet and the sand-expelling holes; pressurizing a fluid into the closed water channel via the water inlet to carry the rest of the sand core to leave the closed water channel via the sand-expelling holes and the water outlet; and applying screw bolts to lock the sand-expelling holes to manufacture a closed-type liquid-cooling motor frame.

6 Claims, 11 Drawing Sheets

(56) References Cited

FOREIGN PATENT DOCUMENTS

| CN | 107528411 | A | * | 12/2017 | |
|----|-----------|---|---|---------|---|
| CN | 107685143 | A | * | 2/2018  | |
| CN | 107716900 | A | * | 2/2018  | |
| CN | 108044031 | A | * | 5/2018  | |
| CN | 108173383 | A | * | 6/2018  | |
| CN | 108649735 | A | * | 10/2018 | ............... B22C 9/10 |
| CN | 111864968 | A | * | 10/2020 | |

* cited by examiner

CLOSED-TYPE LIQUID COOLING MOTOR FRAME AND METHOD FOR MANUFACTURING THE SAME

This application claims the benefit of Taiwan Patent Application Serial No. 109118896, filed Jun. 5, 2020, the subject matter of which is incorporated herein by reference.

BACKGROUND OF THE INVENTION

(1) Field of the Invention

The invention relates to a product and a method for manufacturing the product, and more particularly to a closed-type liquid-cooling motor frame and a method for manufacturing the same.

(2) Description of the Prior Art

In recent years, the water-cooling motor has developed rapidly. By having cooling water to indirectly dissipate heat from the motor, mainly the stator, motor temperature can be maintained no matter what the operating mode is, so that efficiency of the motor can be maintained, and energy consumption can be significantly reduced.

Refer to FIG. 1 and FIG. 2; where FIG. 1 is a schematic perspective view of a conventional open-type liquid-cooling motor frame, and FIG. 2 shows schematically the opened water channel of the conventional open-type liquid-cooling motor frame. As shown, the open-type liquid-cooling motor frame PA1 extending from a first end S1 to a second end S2 is provided.

In general, since the open-type liquid-cooling motor frame PA1 is produced by a casting process, an opened water channel PAT is usually furnished. As shown, since the opened water channel PAT should go through from the first end S1 to the second end S2, thus sealing of the opened water channel PAT is mainly accomplished by joint surfaces and gaskets of the brackets at both sides of the open-type liquid-cooling motor frame PAL However, both machining precision of the joint surface and service life of the gasket would affect tightness of the entire motor frame PAL Further, after a long-term usage, a possibility of tightness failure would be raised. Thus, an improvement upon the conventional open-type liquid-cooling motor frame is definitely needed.

SUMMARY OF THE INVENTION

In view that various problems could be resulted from the tightness failure at the conventional open-type liquid-cooling motor frame, accordingly it is an object of the present invention to provide a closed-type liquid-cooling motor frame and a method for manufacturing the same, by which at least one of the shortcomings in the art can be resulted.

In the present invention, a method for manufacturing a closed-type liquid-cooling motor frame includes the steps of: (a) forming a sand core including a main portion and a plurality of core-head members connected with the main portion, and having the plurality of core-head members to connect a mold by separating the main portion from the mold; (b) applying a casting process to produce a frame casting according to the mold, the main portion and the plurality of core-head members, applying the main portion and the mold respectively to form a first-end inner wall and a second-end inner wall at a first end and a second end of the frame casting, applying the main portion to form a closed water channel between the first-end inner wall and the second-end inner wall, and applying the plurality of core-head members to form a water inlet, a water outlet and a plurality of sand-expelling holes at the first end; (c) shaking the frame casting to have at least a portion of the sand core to leave the closed water channel via the water inlet, the water outlet and the plurality of sand-expelling holes; (d) pressurizing a fluid into the closed water channel via the water inlet, and then the fluid carrying the rest of the sand core to leave the closed water channel via the plurality of sand-expelling holes and the water outlet; and (e) applying a plurality of screw bolts to lock the plurality of sand-expelling holes to form a closed-type liquid-cooling motor frame.

In one embodiment of the present invention, between the step (c) and the step (d), the method for manufacturing a closed-type liquid-cooling motor frame further includes a step (f) of adjusting the frame casting to have the first end lower than the second end.

In one embodiment of the present invention, the step (a) further includes a step (a1) of applying the sand core to form an initial section, a connected middle section and a terminal section, the connected middle section integrating the initial section and the terminal section to form the main portion, the initial section being separated from the terminal section.

In one embodiment of the present invention, the step (a) further includes a step (a2) of applying the sand core to form a plurality of axial extension sub-sections extending individually in an axial direction parallel to a central axis and a plurality of peripheral extension sub-sections extending individually by surrounding the central axis; wherein each of the plurality of axial extension sub-sections and each of the plurality of peripheral extension subsections are connected staggeredly by an end-to-end manner to form the connected middle section.

In one embodiment of the present invention, the step (a) further includes a step (a3) of applying the sand core to form the plurality of core-head members protruding individually from the initial section, the terminal section and the plurality of peripheral extension sub-sections in respective directions away from the central axis.

In one embodiment of the present invention, the step (b) further includes a step (b1) of applying the core-head member that protrudes from the initial section to form the water inlet, applying the core-head member that protrudes from the terminal section to form the water outlet, and applying the core-head members that protrude individually from the corresponding peripheral extension sub-sections to form individually the plurality of sand-expelling holes; wherein all the water inlet, the water outlet and the plurality of sand-expelling holes are connected with the closed water channel.

In one embodiment of the present invention, the step (c) further includes a step (c1) of adjusting the frame casting to have the first end lower than the second end and then shaking the frame casting It is another object of the present invention to provide a closed-type liquid-cooling motor frame, produced by the aforesaid method for manufacturing a closed-type liquid-cooling motor frame, includes a frame casting and a plurality of screw bolts. The frame casting includes the first-end inner wall at the first end and the second-end inner wall at the second end, and is furnished with the closed water channel, the water outlet, the water inlet and the plurality of sand-expelling holes. The closed water channel is located between the first-end inner wall and the second-end inner wall. The water inlet, the water outlet and the plurality of sand-expelling holes are all located at the first end and connected individually with the closed water channel. The screw bolts are used for locking the plurality of sand-expelling holes.

In one embodiment of the present invention, the water inlet, the water outlet and the plurality of sand-expelling holes are protruded individually from the closed water channel in respective directions away from the central axis.

In one embodiment of the present invention, the closed-type liquid-cooling motor frame further includes a plurality of heat-dissipation fins connected with an outer frame wall of the frame casting.

As stated, the method for manufacturing a closed-type liquid-cooling motor frame and the closed-type liquid-cooling motor frame produced by the same method in accordance with the present invention utilize the connection of the core-head members and the mold to form the first-end inner wall and the second-end inner wall, and so the closed water channel enclosed by the first-end inner wall and the second-end inner wall. In comparison to the prior art, the tightness can be enhanced, and the service life can be extended.

All these objects are achieved by the closed-type liquid-cooling motor frame and the method for manufacturing the same described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a closed-type liquid-cooling motor frame and a method for manufacturing the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
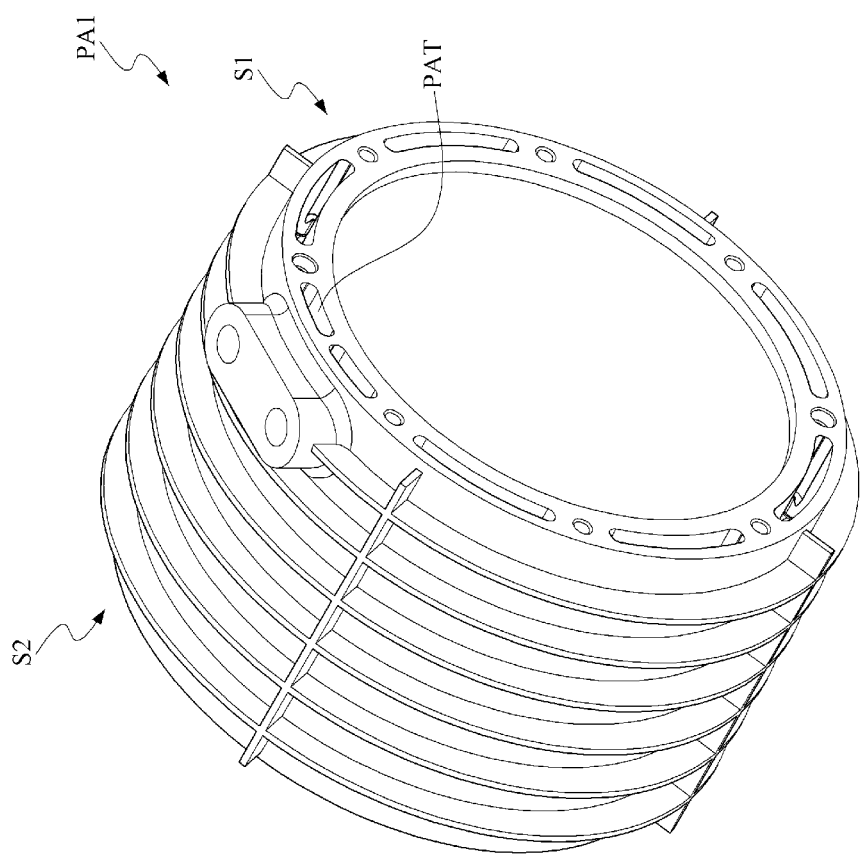
FIG. 1 is a schematic perspective view of a conventional open-type liquid-cooling motor frame.
Figure 2:
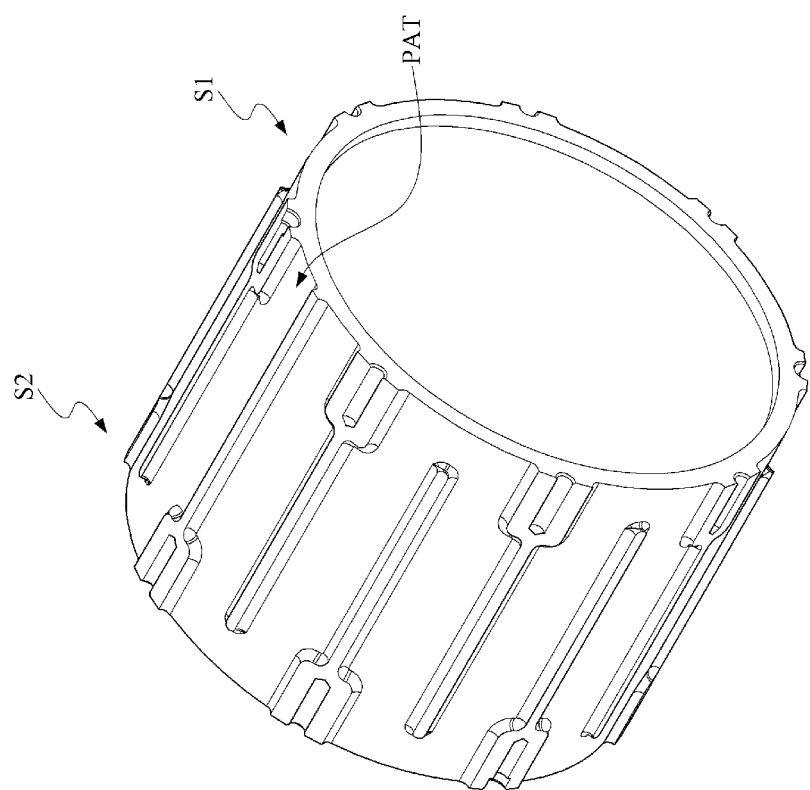
FIG. 2 shows schematically the opened water channel of the conventional open-type liquid-cooling motor frame.
Figure 3A:
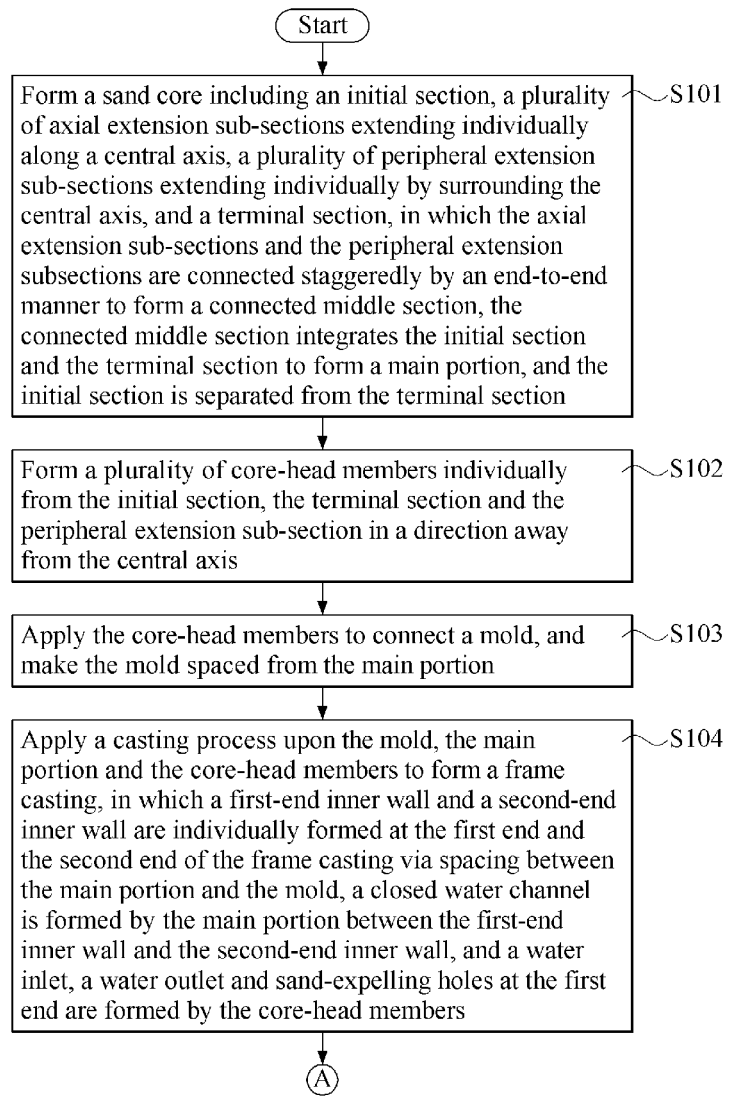
FIG. 3A and FIG. 3B show together a flowchart of the preferred method for manufacturing a closed-type liquid-cooling motor frame in accordance with the present invention.
Figure 3B:
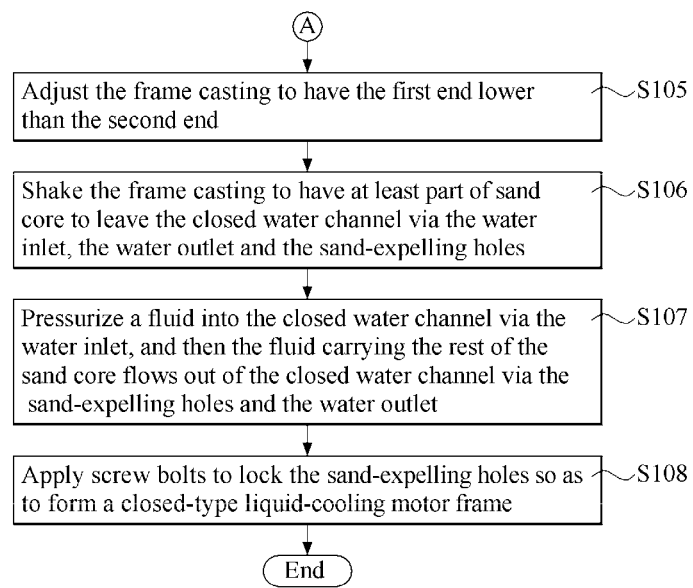
Figure 4:
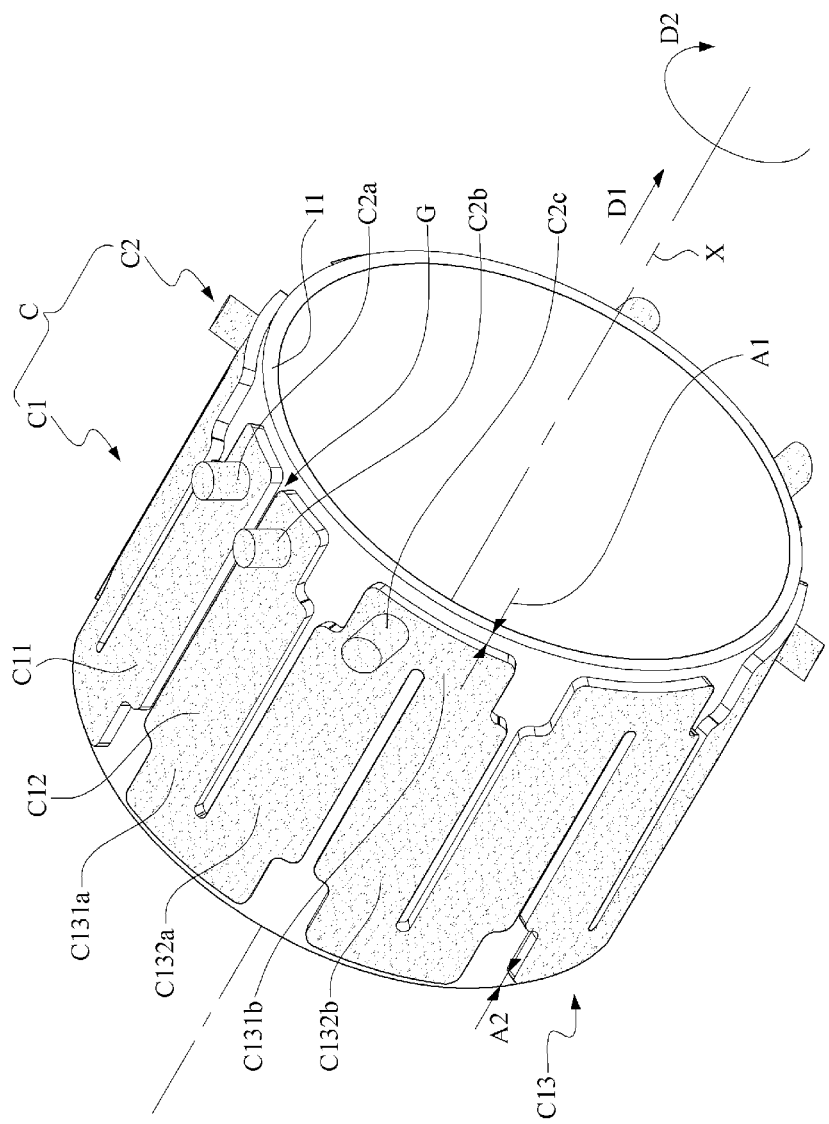
FIG. 4 is a schematic perspective view of the sand core in accordance with the present invention.
Figure 5:
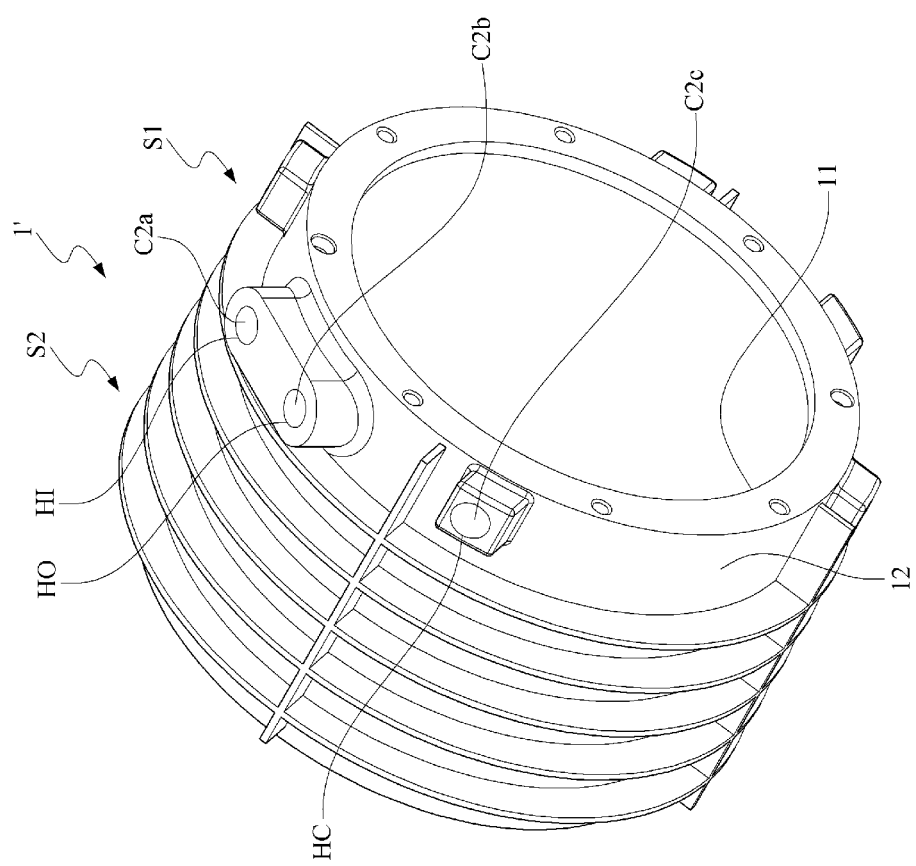
FIG. 5 is a schematic perspective view of the frame casting produced by the method for manufacturing a closed-type liquid-cooling motor frame of FIG. 3A and FIG. 3B.
Figure 6:
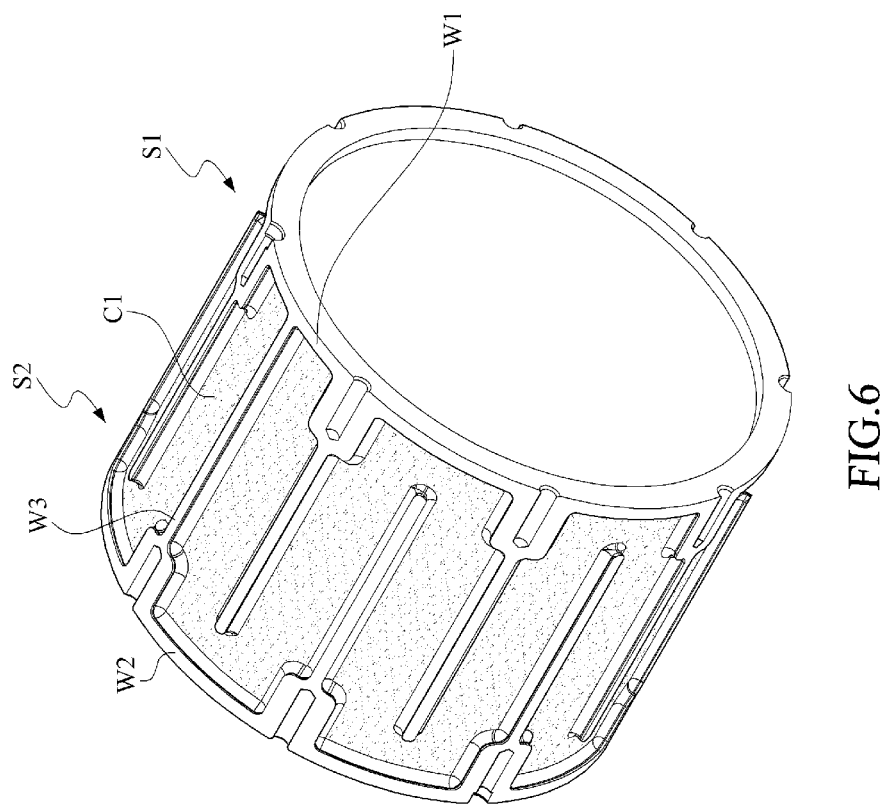
FIG. 6 is a schematic perspective view of the closed water channel in accordance with the present invention.
Figure 7:
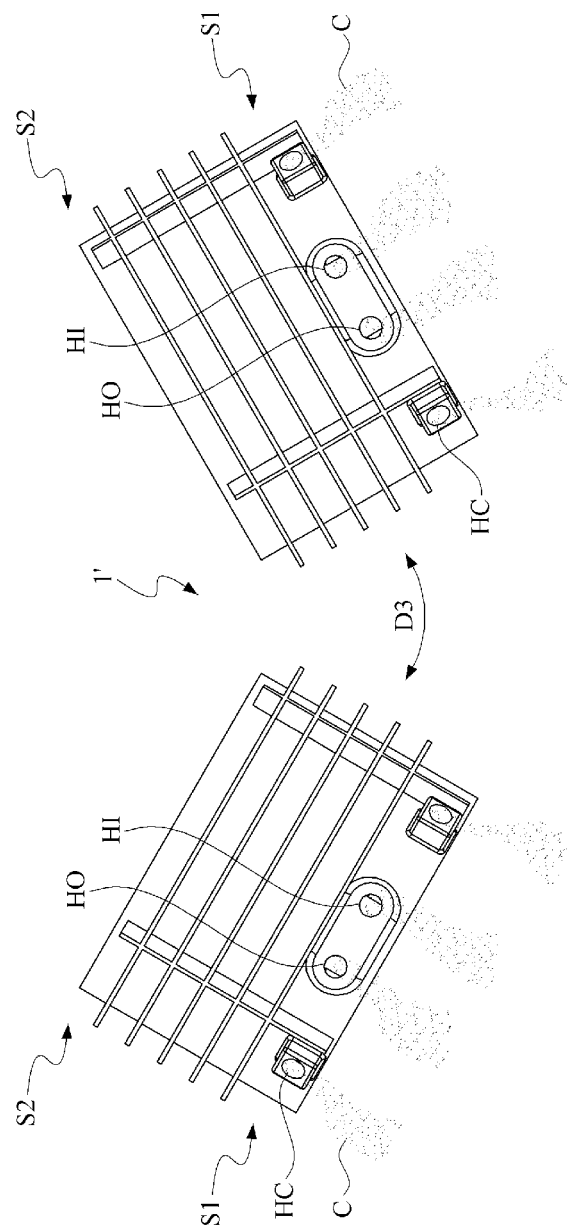
FIG. 7 through FIG. 9 demonstrate schematically the process for cleaning off the sand core in accordance with the present invention.
Figure 8:
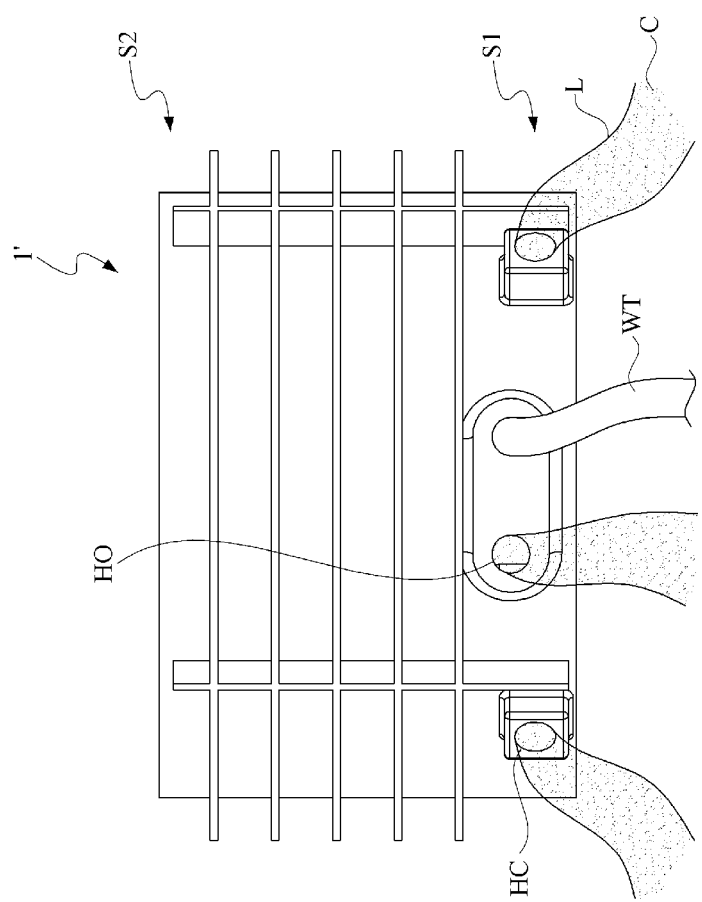
Figure 9:
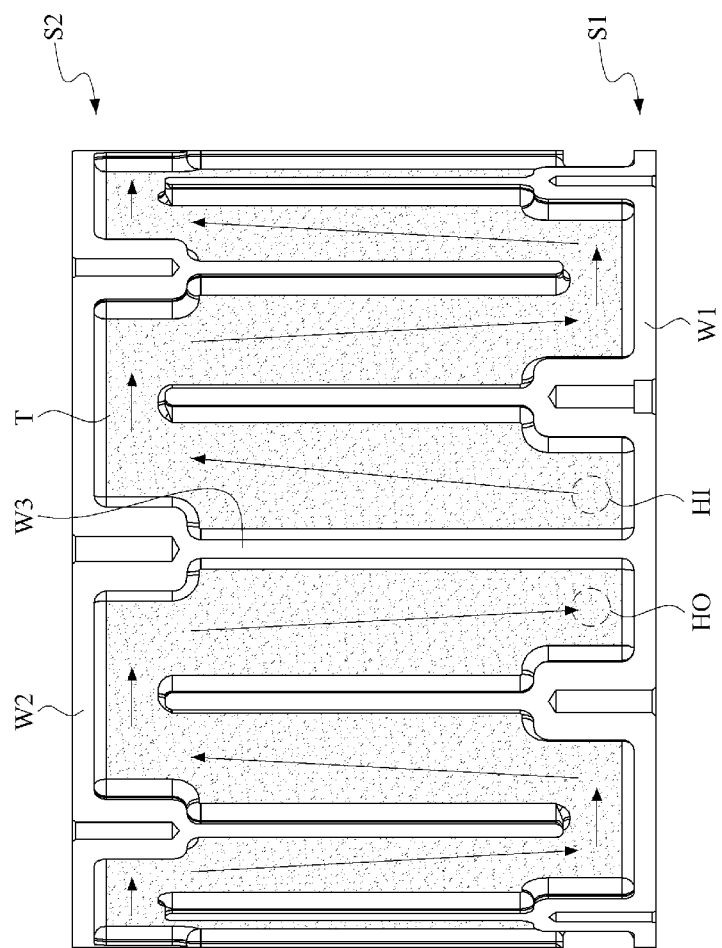
Figure 10:
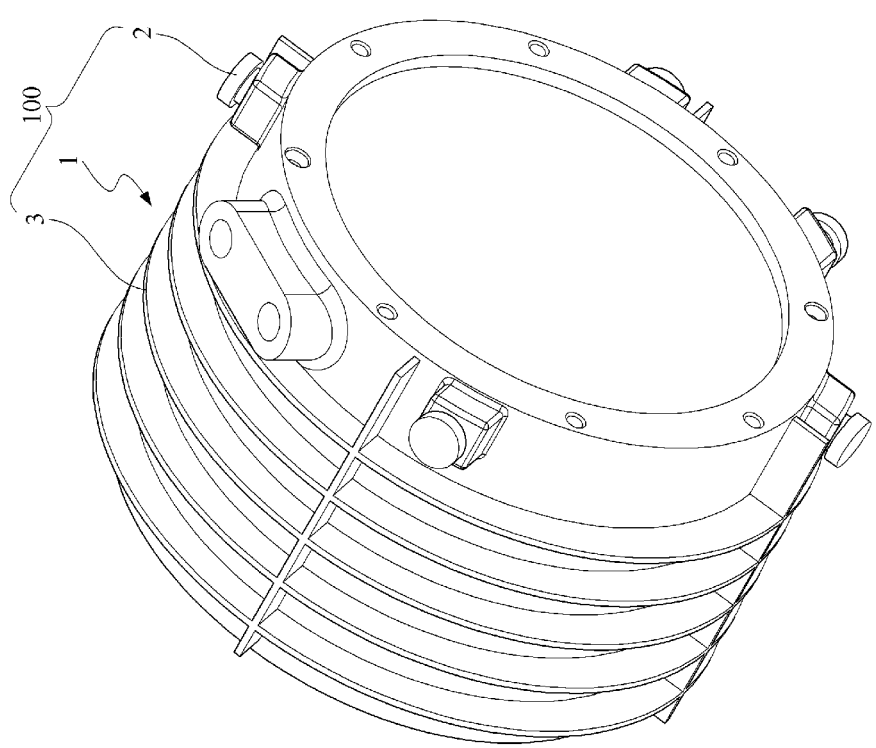
FIG. 10 is a schematic perspective view of the closed-type liquid-cooling motor frame produced by the method for manufacturing the closed-type liquid-cooling motor frame in accordance with the present invention.

Refer to FIG. 3A through FIG. 10; where FIG. 3A and FIG. 3B show together a flowchart of the preferred method for manufacturing a closed-type liquid-cooling motor frame in accordance with the present invention, FIG. 4 is a schematic perspective view of the sand core in accordance with the present invention, FIG. 5 is a schematic perspective view of the frame casting produced by the method for manufacturing a closed-type liquid-cooling motor frame of FIG. 3A and FIG. 3B, FIG. 6 is a schematic perspective view of the closed water channel in accordance with the present invention, FIG. 7 through FIG. 9 demonstrate schematically the process for cleaning off the sand core in accordance with the present invention, and FIG. 10 is a schematic perspective view of the closed-type liquid-cooling motor frame produced by the method for manufacturing the closed-type liquid-cooling motor frame in accordance with the present invention. As shown, the method for manufacturing the closed-type liquid-cooling motor frame includes the following Step S101 to Step S108.

Step S101: Form a sand core including an initial section, a plurality of axial extension sub-sections extending individually along a central axis, a plurality of peripheral extension sub-sections extending individually by surrounding the central axis, and a terminal section, in which the axial extension sub-sections and the peripheral extension subsections are connected staggeredly by an end-to-end manner to form a connected middle section, the connected middle section integrates the initial section and the terminal section to form a main portion, and the initial section is separated from the terminal section.

As shown in FIG. 4, the sand core C is formed to include an initial section C11, a terminal section C12 and a connected middle section C13. The connected middle section C13 connects the initial section C11 at one end and the terminal section C12 at another end to form together a main portion C1. The initial section C11 is separated from the terminal section C12 by a gap G.

The connected middle section C13 includes at least a plurality of peripheral extension sub-sections C131$a$, C131$b$ (two labeled only in the figure) and a plurality of axial extension sub-sections C132$a$, C132$b$ (two labeled only in the figure). Each of the axial extension sub-sections C132$a$, C132$b$ is extended in an axial direction D1 parallel to a central axis X. Each of the peripheral extension sub-sections C131$a$, C131$b$ is extended in a circumferential direction D2 surrounding the central axis X. Each of the axial extension sub-sections C132$a$, C132$b$ has two opposite ends connected with two individual peripheral extension sub-sections, respectively. As shown, one end of the axial extension sub-sections C132$a$ is connected with the peripheral extension sub-sections C131$a$, while another end thereof is connected with the peripheral extension sub-sections C131$b$.

In addition, the peripheral extension sub-sections C131$a$, C131$b$ and the axial extension sub-sections C132$a$, C132$b$ can be seen as different sections of the same continuous winding structure. As shown, one end of the axial extension sub-section C132$a$ is connected to the peripheral extension sub-sections C131$a$, while another end thereof is connected to the peripheral extension sub-section C131$b$. Further, the peripheral extension sub-section C131$b$ provides another end to connect the axial extension sub-sections C132$b$. In other words, the connected middle section C13 includes at least one set of the aforesaid connection.

Step S102: Form a plurality of core-head members individually from the initial section, the terminal section and the peripheral extension sub-section in individual directions away from the central axis.

As shown in FIG. 4, a plurality of core-head members C2 are protruded from the initial section C11, the terminal section C12 and the peripheral extension sub-sections C131b of the sand core C in directions away from the central axis X. In the figure, typical core-head members C2, C2a, C2b, C2c are labeled.

For example, the core-head member C2a protrudes from the initial section C11 in a direction leaving or away from the central axis X, the core-head member C2b protrudes from the terminal section C12 in another direction extending from the central axis X, and the core-head member C2c protrudes from the peripheral extension sub-section C131b in a further direction away from the central axis X. In particular, all these core-head members are located at the same first end S1.

Step S103: Apply the core-head members to connect a mold, and make the mold spaced from the main portion.

In this embodiment, the sand core C provides the core-head members C2 to connect or support directly the mold. Namely, the main portion C1 would not contact the mold directly, thus the main portion C1 is separated from the mold. By having a plurality of core-head members C2 to support the mold, the entire connection strength can be increased, and thus many positioning problems caused by less connection strength can be avoided.

Step S104: Apply a casting process upon the mold, the main portion and the core-head members to form a frame casting, in which a first-end inner wall and a second-end inner wall are individually formed at the first end and the second end of the frame casting via spacing between the main portion and the mold, a closed water channel is formed by the main portion between the first-end inner wall and the second-end inner wall, and a water inlet, a water outlet and sand-expelling holes at the first end are formed by the core-head members.

Based on the aforesaid connection setup of the mold, the main portion C1 and the core-head members C2, the casting process is applied to produce the frame casting 1', as shown in FIG. 4 to FIG. 6. It shall be explained that, at this stage, the frame casting 1' still contains thereinside the sand core C.

The frame casting 1' includes an inner frame wall 11 and an outer frame wall 12, and is extended from the first end S1 to a second end S2. Since the main portion C1 of the sand core C does not contact directly the mold, thus, after the casting process, the main portion C1 would be located between the inner frame wall 11 and the outer frame wall 12, and an axial end spacing A1 or A2 would exist between the main portion C1 and the first end S1 or the second end S2, respectively. For the existence of the axial end spacing A1 and A2, thus the frame casting 1' would form a first-end inner wall W1 and a second-end inner wall W2 at the first end S1 and the second end S2, respectively. Thereupon, a closed water channel T (labeled in FIG. 9) corresponding to the main portion C1 would be formed in the space defined between the inner frame wall 11 and the outer frame wall 12, and also between the first-end inner wall W1 and the second-end inner wall W2.

In addition, since the gap G exists between the initial section C11 and the terminal section C12 of the main portion C1, thus, after the casting process is completed, the frame casting 1' would include a separation wall W3 corresponding to the gap G.

It shall be explained that, in FIG. 4, the image of the sand core C on the inner frame wall 11 is only for concise explanation only. In this embodiment, the expandable pattern casting is applied, and thus the inner frame wall 11 and the outer frame wall 12 would be formed simultaneously to enclose the sand core C.

Since the core-head members C2 are applied to contact the mold, thus, after the mold is removed (i.e., the casting process is completed), the spaces originally occupied by the core-head members C2 would form a water inlet HI, a water outlet HO and a plurality of sand-expelling holes HC. Further, in detail, the core-head member C2a originally connected with the initial section C11 would form a water inlet HI, the core-head member C2b originally connected with the terminal section C12 would form a water outlet HO, and the core-head member C2c originally connected with the peripheral extension sub-section C131b would form a corresponding sand-expelling hole HC. In this embodiment, since all the core-head members C2 are located at the first end S1, and thus the corresponding water inlet HI, water outlet HO and sand-expelling holes HC are all located at the first end S1.

Step S105: Adjust the frame casting to have the first end to be lower than the second end.

Step S106: Shake the frame casting to have at least part of the sand core to leave the closed water channel via the water inlet, the water outlet and the sand-expelling holes.

Step S107: Pressurize a fluid into the closed water channel via the water inlet, and then the fluid carrying the rest of the sand core would flow out of the closed water channel via the sand-expelling holes and the water outlet.

Steps S105 to S107 are applied to remove the entire sand core C out of the frame casting 1', referred to FIG. 7 to FIG. 9 together. Since the water inlet HI, the water outlet HO and the sand-expelling holes HC are all located at the first end S1, thus the frame casting 1' can be adjusted in advance to have the first end S1 lower than the second end S2.

Then, the frame casting 1' is shaken to have at least part of the sand core C to leave the closed water channel T via the water inlet HI, the water outlet HO and the sand-expelling holes HC. In this embodiment, it is shown in FIG. 7 that the frame casting 1' is shaken in a shaking direction D3. Practically, though shaking the frame casting 1' can remove a large portion of the sand core C to leave the closed water channel T via the water inlet HI, the water outlet HO and the sand-expelling holes HC, yet still a small portion of the sand core C would remain inside the frame casting 1' anyway.

Thereafter, a water tube WT would be connected to the water inlet HI so as to introduce a pressurized fluid L into the closed water channel T via the water inlet HI. After the pressurized fluid L flows through the closed water channel T and is then exhausted therefrom via the sand-expelling holes HC and the water outlet HO, the rest of the sand core C would be expelled out of the closed water channel T completely. Thus, at this time, the space originally occupied by the main portion C1 would completely form the closed water channel T. It shall be explained that in the listed figures herein are only used for indicating the position of the sand core C, not for the small remaining portion of the sand core C. In addition, since all the sand core C can be expelled out of the frame casting 1', thus, after Step S107 is performed, the frame casting would be relabeled from "1 to "1" (in FIG. 10) for a discrimination purpose.

It shall be explained that, in this embodiment, the execution order of Step S105 and Step S106 can be exchanged.

Step S108: Apply screw bolts to lock the sand-expelling holes so as to form a closed-type liquid-cooling motor frame.

A plurality of screw bolt 2 are applied to lock the corresponding sand-expelling holes HC of the frame casting 1, so that a closed-type liquid-cooling motor frame 100 can be formed, as shown in FIG. 10. The closed-type liquid-cooling motor frame 100 is furnished thereinside with the closed water channel T between the inner frame wall 11 and the outer frame wall 12 and also between the first-end inner wall W1 and the second-end inner wall W2. Namely, the closed water channel T is structurally enclosed by the inner frame wall 11, the outer frame wall 12, the first-end inner wall W1 and the second-end inner wall W2, and the water inlet HI, the water outlet HO and the sand-expelling holes HC are used for connecting the closed water channel T to the atmosphere. Further, with the screw bolts 2 to lock the corresponding sand-expelling holes HC, only the water inlet HI and the water outlet HO are left for the closed water channel T to communicate the outsides. In an exemplary example, the water inlet HI and the water outlet HO would be connected with a cooling device. In other words, the closed water channel T would form a close loop with the cooling device. A cooling fluid outputted from the cooling device would be introduced into the closed water channel T via the water inlet HI, then flows through the closed water channel T, and finally flows back to the cooling device via the water outlet HO. Thereupon, heat at the frame casting 1 would be dissipated mainly through the cooling fluid that flow through the closed water channel T thereof.

Preferably, the mold can be designed to have a plurality of heat-dissipation fins 3 at the outer frame wall 12 of the frame casting. Thus, the closed-type liquid-cooling motor frame 100 can further include the heat-dissipation fins 3 that connect solidly but indirectly the closed water channel T via the outer frame wall 12, so that the heat-dissipation fins 3 can be used for dissipating the heat in the closed water channel T. In addition, in order to connect the cooling device conveniently, the water inlet HI and the water outlet HO can be furnished with a common connected block as shown in FIG. 10.

Thus, the closed-type liquid-cooling motor frame 100 of this invention would be waived from the tightness problem at the conventional open-type liquid-cooling motor frame PAL Even though the manufacturing process of this invention may be more tedious, yet the closed water channel T enclosed by the first-end inner wall W1 and the second-end inner wall W2 in accordance with the present invention would be accompanied by no tightness problem. Also, after a long-term usage, there would exist no risk of failure in tightness. Thus, performance in both the tightness and the service life of this invention would be significantly superior to the conventional art.

In summary, in the method for manufacturing a closed-type liquid-cooling motor frame and the closed-type liquid-cooling motor frame provided by the present invention, the core-head members are introduced to connect the mold so as to produce the closed water channel defined by the first-end inner wall, the second-end inner wall, the first-end inner wall and the second-end inner wall. In comparison with the prior art, the tightness performance of this invention can be greatly enhanced, and the service life can be remarkably extended. In addition, a plurality of core-head members are utilized to form the water inlet, the water outlet and the sand-expelling holes. By having the first end to be lower than the second end, the sand core can be expelled out of the frame casting by shaking, and by introducing the pressurized fluid. Thereupon, the closed-type liquid-cooling motor frame furnished with the closed water channel can be manufactured.

While the present invention has been particularly shown and described with reference to a preferred embodiment, it will be understood by those skilled in the art that various changes in form and detail may be without departing from the spirit and scope of the present invention.

What is claimed is:

1. A method for manufacturing a closed-type liquid-cooling motor frame, comprising the steps of:
   (a) providing a sand core having a main portion and a plurality of core-head members connected with the main portion, wherein the sand core comprises an initial section, a connected middle section and a terminal section, the connected middle section is located between the initial section and the terminal section; wherein the connected middle section comprises a plurality of axial extension sub-sections extending individually in an axial direction parallel to a central axis and a plurality of peripheral extension sub-sections extending individually by surrounding the central axis, and each of the plurality of axial extension sub-sections and each of the plurality of peripheral extension sub-sections are connected staggeredly by an end-to-end manner; wherein the plurality of core-head members are identical to each other;
   (b) performing a casting process to produce a frame casting, wherein the frame casting has oppositely a first and a second end, the first end has a first-end inner wall, the second end has a second-end inner wall, the main portion forms a closed water channel between the first-end inner wall and the second-end inner wall, and the plurality of core-head members form individually a water inlet, a water outlet and a plurality of sand-expelling holes at the first end; wherein the plurality of core-head members protrude individually from the initial section, the terminal section and the plurality of peripheral extension sub-sections in respective directions away from the central axis, the core-head member protruding from the initial section is to form the water inlet, the core-head member protruding from the terminal section is to form the water outlet, and the core-head members protruding individually from the corresponding peripheral extension sub-sections are to form the plurality of sand-expelling holes;
   (c) shaking the frame casting to expel at least a portion of the sand core from the closed water channel through the water inlet, the water outlet and the plurality of sand-expelling holes;
   (d) pressurizing a fluid into the closed water channel via the water inlet, and then the fluid carrying the rest of the sand core to leave the closed water channel via the plurality of sand-expelling holes and the water outlet; and
   (e) providing a plurality of screw bolts to lock the plurality of sand-expelling holes to form a closed-type liquid-cooling motor frame.

2. The method for manufacturing a closed-type liquid-cooling motor frame of claim 1, between the step (c) and the step (d), further including comprising a step (f) of tilting the frame casting to have the first end lower than the second end.

3. The method for manufacturing a closed-type liquid-cooling motor frame of claim 1, wherein the step (c) further comprises a step (c1) of tilting the frame casting to have the first end lower than the second end and then shaking the frame casting.

4. A closed-type liquid-cooling motor frame, produced by the method for manufacturing a closed-type liquid-cooling motor frame of claim 1, comprising:
   the frame casting, comprising the first-end inner wall at the first end and the second-end inner wall at the second end, furnished with the closed water channel, the water outlet, the water inlet and the plurality of sand-expelling holes, the closed water channel being located between the first-end inner wall and the second-end inner wall, the water inlet, the water outlet and the plurality of sand-expelling holes being located at the first end and connected individually with the closed water channel; and the plurality of screw bolts, locking the plurality of sand-expelling holes.

5. The closed-type liquid-cooling motor frame of claim 4, wherein the water inlet, the water outlet and the plurality of sand-expelling holes protrude individually from the closed water channel in respective directions away from the central axis.

6. The closed-type liquid-cooling motor frame of claim 4, further comprising a plurality of heat-dissipation fins connected with an outer frame wall of the frame casting.

\* \* \* \* \*